J. P. WILLIAMS.
SNAP FASTENER.
APPLICATION FILED AUG. 16, 1911.
1,080,614.
Patented Dec. 9, 1913.
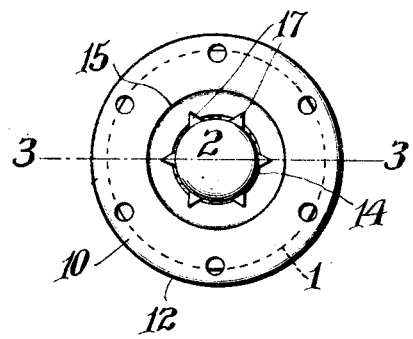
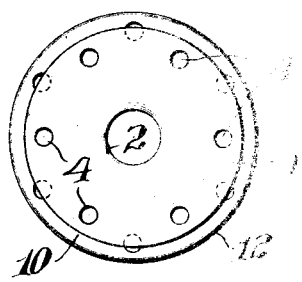
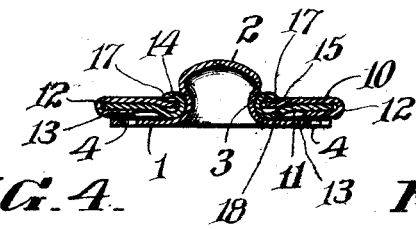
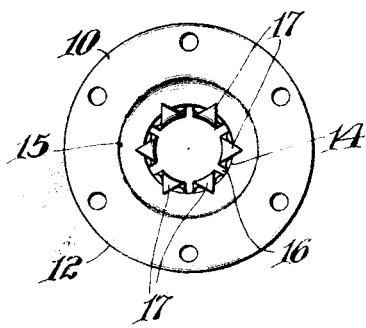
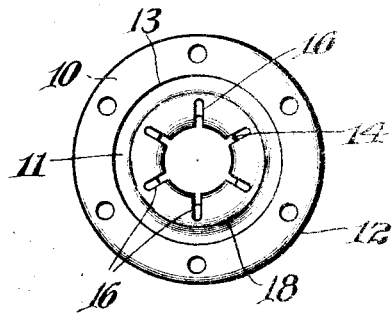
WITNESSES
Daniel Webster Jr.
William Conway
INVENTOR
James P. Williams
BY Cyrus N. Anderson
ATTORNEY

UNITED STATES PATENT OFFICE.

JAMES P. WILLIAMS, OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

SNAP-FASTENER.

1,080,614. Specification of Letters Patent. Patented Dec. 9, 1913.

Application filed August 16, 1911. Serial No. 644,268.

*To all whom it may concern:*

Be it known that I, JAMES P. WILLIAMS, a citizen of the United States, residing in Philadelphia, county of Philadelphia, State of Pennsylvania, have invented certain new and useful Improvements in Snap-Fasteners, of which the following is a specification.

My invention relates to improvements in snap fasteners and particularly to the socket member thereof.

It has for its object to provide a socket member of a snap fastener constructed of two plates or disks which will be strong and durable and which shall also possess the requisite resilience and the quality of firmly and securely holding the ball member of the fastener.

Other objects and advantages of my invention will be referred to in the detailed description of the invention which follows or will be apparent therefrom.

One embodiment of a convenient form of my invention is illustrated in the accompanying drawing, but it will be understood that changes in the details of construction and in the form and contour of the parts entering into the construction thereof may be made within the scope of the claims without departing from my said invention.

In the drawings:—Figure 1 is a plan view of one side of the socket member of a fastener with the ball or stud of the ball member projecting through the socket thereof;—Fig. 2 is a plan view of the bottom of the ball member of a fastener which is in engagement with a socket member, the edges of the latter appearing beyond the edges of the ball member;—Fig. 3 is a transverse section on the line 3—3 of Fig. 1;—Fig. 4 is a plan view of one side of the socket member of the fastener, similar to Fig. 1, the ball member being omitted; and—Fig. 5 is a plan view of the opposite side of the socket member, the said ball member being omitted.

Referring to the drawings, 1 designates what may be termed the flange or body portion of the ball member of a snap fastener, 2 the ball or stud of the said ball member and 3 the connecting neck portion thereof. The said ball member is shown in engagement with the socket member of the fastener in order to illustrate the manner of coöperation of said members. The ball member is adapted to be secured by means of threads (not shown) passed through the thread holes or openings 4, and which threads are also passed through the garment or other article to which it is desired to secure the said ball member. Any other means may be employed for securing the ball member to said garment or other article. The socket member of the fastener as illustrated consists of two plates, 10 and 11, in disk form, interlocked so that together they constitute a structure in which said plates coöperate to form the socket member of a fastener having the requisite resilience and spring action which enables it to firmly hold the ball or stud of the ball member of the fastener.

The plates 10 and 11 are arranged in substantial parallel relation with respect to and in contact with each other. The plate 10 is of greater diameter and area than the plate 11, so that the outer edges thereof, when the plates are placed against each other, extend beyond the outer edges of the plate 11. The overhanging edges of the plate 10 are turned over and around the edges of the plate 11, as indicated at 12, in Fig. 3 of the drawing. The extreme outer edge 13 of the said plate 10 extends over the plate 11 a short distance upon the side thereof opposite to the main or body portion of the said plate 10. By this construction and arrangement the outer edge of the plate 11 is enfolded within the bent over outer edge portion of the plate 10, as is indicated at 12, and the two plates are thereby secured together. The plate 10 is provided with a hole or opening 14, and preferably, though not necessarily, the portion of the said plate surrounding the said hole or opening is depressed as indicated at 15.

Radial slits or slots 16 extend from the center outwardly a suitable distance in the plate 11. The presence of these slits or slots in the plate 11, causes the formation of pointed projections or prongs 17 at the central portion of the said plate 11. These prongs or projections are bent slightly laterly, as indicated at 18, and are then bent and extended through the opening 14 in the member 10 and beyond the surface of the depressed portion 15, the ends then being bent down into, or substantially into, contact with the surface of the said depressed portion. By reason of the depression of the portion of the member 10 around the opening 14, the points of the prongs or projections 17 are to a greater or less extent protected.

While in Fig. 5, of the drawings, the slits or slots 16 are shown as of considerable width, it should be understood, in the first place, that the drawings are made upon an enlarged scale and, in the second place, that the width of the said slits or slots, may be varied, within limits, at the will of the manufacturer or person constructing the fastener.

Although in the drawings the ball or stud of the ball member is illustrated as having been inserted through the socket of the socket member from the side constituted of the plate 11, it is to be understood that, if desired, the ball or stud of the ball member may be inserted from the opposite side of the socket member, the said member operating as efficiently when the ball or stud is inserted from one side as when inserted from the other.

The portions of the prongs or projections 17 which are bent and extended through the opening 14 in the plate 10 and around the edge thereof are separated from the said edge so that they may yield sufficiently to permit the passage of the ball or stud of the ball member therethrough.

Having thus described my invention, I claim:—

1. The socket member of a snap fastener comprising two centrally apertured plates one being of greater outside diameter than the other and having its outer edge portion folded over to inclose the corresponding edge of the other and said other plate carrying projections from its inner edge, said projections being bent outwardly then reversely and arranged to extend through the aperture in and engage the opposite side of the first plate, said projections being entirely free of the adjacent edge of said first plate.

2. The socket member of a snap fastener comprising two centrally apertured plates in parallel relation with each other, one being of greater outside diameter than the other and having its outer edge portion folded over to inclose the corresponding edge of the other, and said other plate carrying integral projections from its inner edge, said projections being bent outwardly then reversely and arranged to extend through the aperture in and to inclose the inner edge portion of the first plate, said projections being entirely free of the inner edge of said first plate.

In testimony that I claim the foregoing as my invention, I have hereunto signed my name this 15th day of August, A. D. 1911.

JAMES P. WILLIAMS.

In the presence of—
GEO. H. WEIDNER,
CARRIE E. KLEINFELDER.